(12) United States Patent
D'Souza

(10) Patent No.: US 9,046,966 B2
(45) Date of Patent: *Jun. 2, 2015

(54) METHOD AND SYSTEM FOR CALIBRATING AN ACOUSTIC TOUCHSCREEN

(71) Applicant: ELO TOUCH SOLUTIONS, INC., Milpitas, CA (US)

(72) Inventor: Henry M. D'Souza, San Diego, CA (US)

(73) Assignee: ELO TOUCH SOLUTIONS, INC., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/942,545

(22) Filed: Jul. 15, 2013

(65) Prior Publication Data
US 2014/0160083 A1    Jun. 12, 2014

Related U.S. Application Data

(63) Continuation of application No. 11/820,923, filed on Jun. 21, 2007, now Pat. No. 8,493,332.

(51) Int. Cl.
G06F 3/043    (2006.01)
G06F 3/041    (2006.01)

(52) U.S. Cl.
CPC .............. *G06F 3/043* (2013.01); *G06F 3/0418* (2013.01); *G06F 3/0436* (2013.01)

(58) Field of Classification Search
CPC ....... G06F 3/043; G06F 3/044; G06F 3/0418; G06F 3/0436
See application file for complete search history.

(56) References Cited

U.S. PATENT DOCUMENTS 8,493,332 B2 *    7/2013    D'Souza ....................... 345/173

* cited by examiner

*Primary Examiner* — Kenneth B Lee, Jr.
(74) *Attorney, Agent, or Firm* — Alston & Bird LLP

(57) ABSTRACT

A method for calibrating an Acoustic Pulse Recognition (APR) touchscreen comprises touching an APR touchscreen at N comparison touch points. N audio profiles are acquired, and each of the N audio profiles are associated with one of the N comparison touch points. A predetermined calibration file is selected based on the N audio profiles. The predetermined calibration file comprises audio profiles associated with coordinate locations on the touchscreen.

13 Claims, 4 Drawing Sheets

METHOD AND SYSTEM FOR CALIBRATING AN ACOUSTIC TOUCHSCREEN

CROSS-REFERENCE TO RELATED APPLICATIONS

This application is a continuation of U.S. patent application Ser. No. 11/820,923, filed Jun. 21, 2007 (now U.S. Pat. No. 8,493,332), which is incorporated herein by reference in its entirety.

BACKGROUND OF THE INVENTION

This invention relates generally to calibrating touchscreens, and more particularly, to calibrating a touchscreen that recognizes a user touch as a unique audio profile.

Touch display systems, or "touch displays", are provided for an increasing number of applications. Point of sale (POS), for processing transactions within a department store or restaurant, and point of information (POI), such as an electronic directory are common. For example, applications include airport passenger and baggage check-in, and kiosks located within a store that provide information about products and services. The kiosks also may be used to place an order and/or complete a purchase without the assistance of a sales person.

A touch display system has a display for visually presenting data to a user. A touchscreen is installed in front of the display, and the user selects and/or inputs data by touching the touchscreen at locations over software programmed buttons or icons in the displayed image.

One type of touchscreen technology is Acoustic Pulse Recognition (APR). Generally, an APR touchscreen recognizes the sound created when the glass is touched at a given position. A touch at each different position on the glass generates a unique sound. More specifically, one or more microphones on the glass or other substrate of the touchscreen detect the sound, represented as a signal, which results from a user touching a point on the glass.

A calibration file allows the user to successfully interact with the display that may be a graphical user interface (GUI) having buttons and icons or other graphical representations. Prior to normal use, X, Y coordinate positions on the touchscreen are associated with the signals generated when the particular X, Y coordinate is touched. The signals may be stored as a string of audio profiles in the calibration file. When a user touches the touchscreen, the resultant signal is compared to the audio profiles stored in the calibration file. The matching audio file is used to identify the location of the user's touch.

Each APR touchscreen varies slightly, and thus each APR touchscreen is individually calibrated or characterized to acquire and store a unique calibration file. During calibration, the APR touchscreen is loaded on a calibration machine specifically designed for the task. Many touches are generated, such as over 4000 touches, at known X, Y coordinate locations. For each of the over 4000 touches, a specific audio profile is stored and associated with the known X, Y coordinate location. This process is time consuming, due to both the number of coordinate locations which are touched as well as the time required on the calibration machine. Acquiring additional calibration machines is expensive, and thus throughput is limited by the calibration time as well as the number of available calibration machines.

Therefore, a need exists for decreasing the amount of time needed to calibrate an APR touchscreen. Certain embodiments of the present invention are intended to meet these needs and other objectives that will become apparent from the description and drawings set forth below.

BRIEF DESCRIPTION OF THE INVENTION

In one embodiment, a method for calibrating an Acoustic Pulse Recognition (APR) touchscreen comprises touching an APR touchscreen at N comparison touch points. N audio profiles are acquired, and each of the N audio profiles are associated with one of the N comparison touch points. A predetermined calibration file is selected based on the N audio profiles. The predetermined calibration file comprises audio profiles associated with coordinate locations on the touchscreen.

In another embodiment, a system for calibrating an APR touchscreen comprises a touchscreen and a processor. The touchscreen comprises a plurality of microphones mounted to a substrate. The processor is configured to receive N audio profiles associated with N comparison touch points. The N audio profiles are representative of signals detected by the plurality of microphones. The processor is also configured to compare the N audio profiles to a plurality of sets of N pre-recorded audio profiles, and to select a predetermined calibration file based on the comparison. The predetermined calibration file comprises audio profiles representative of coordinates of touch points on the touchscreen.

In another embodiment, a method for calibrating an APR touchscreen comprises acquiring calibration files. Each of the calibration files is associated with a different APR touchscreen and comprises audio profiles associated with coordinate locations on the touchscreen. The calibration files are sorted into groups based on a difference threshold, and a predetermined calibration file is computed for each group. Each of the predetermined calibration files are representative of the calibration files within each of the groups. The predetermined calibration files are used by APR touchscreens not included within the groups.

In another embodiment, a computer readable medium for use in an APR touchscreen comprises instructions to acquire audio profiles representative of touch points on a current APR touchscreen. The computer readable medium also comprises instructions to select a calibration file for the current APR touchscreen from a plurality of predetermined calibration files based at least on the audio profiles.

In another embodiment, an APR touchscreen comprises a touchscreen that has a substrate and a plurality of microphones mounted to the substrate. A processor is configured to receive a predetermined calibration file associated with the touchscreen. The predetermined calibration file comprises audio profiles that are representative of coordinates of touch points on the touchscreen. A memory stores the predetermined calibration file.

DETAILED DESCRIPTION OF THE INVENTION

Figure 1:
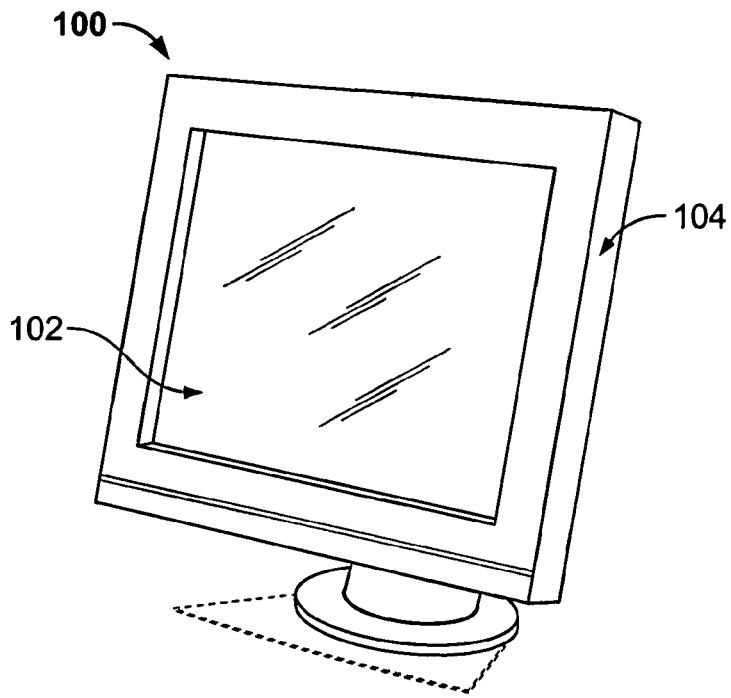
FIG. 1 illustrates a touch display comprising an Acoustic Pulse Recognition (APR) touchscreen and a display housing in accordance with an embodiment of the present invention.

The foregoing summary, as well as the following detailed description of certain embodiments of the present invention, will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or random access memory, hard disk, or the like). Similarly, the programs may be stand alone programs, may be incorporated as subroutines in an operating system, may be functions in an installed software package, and the like. It should be understood that the various embodiments are not limited to the arrangements and instrumentality shown in the drawings.

FIG. 1 illustrates a touch display 100 comprising an Acoustic Pulse Recognition (APR) touchscreen 102 and a display housing 104. The touchscreen 102 is installed over a display screen (not shown). It should be understood that the touch display 100 may be other sizes and shapes. The touch display 100 may be installed on a desk, a wall, or within a kiosk, for example, or similar construction may be used to form a hand-held device such as a personal digital assistant (PDA).

Figure 2:
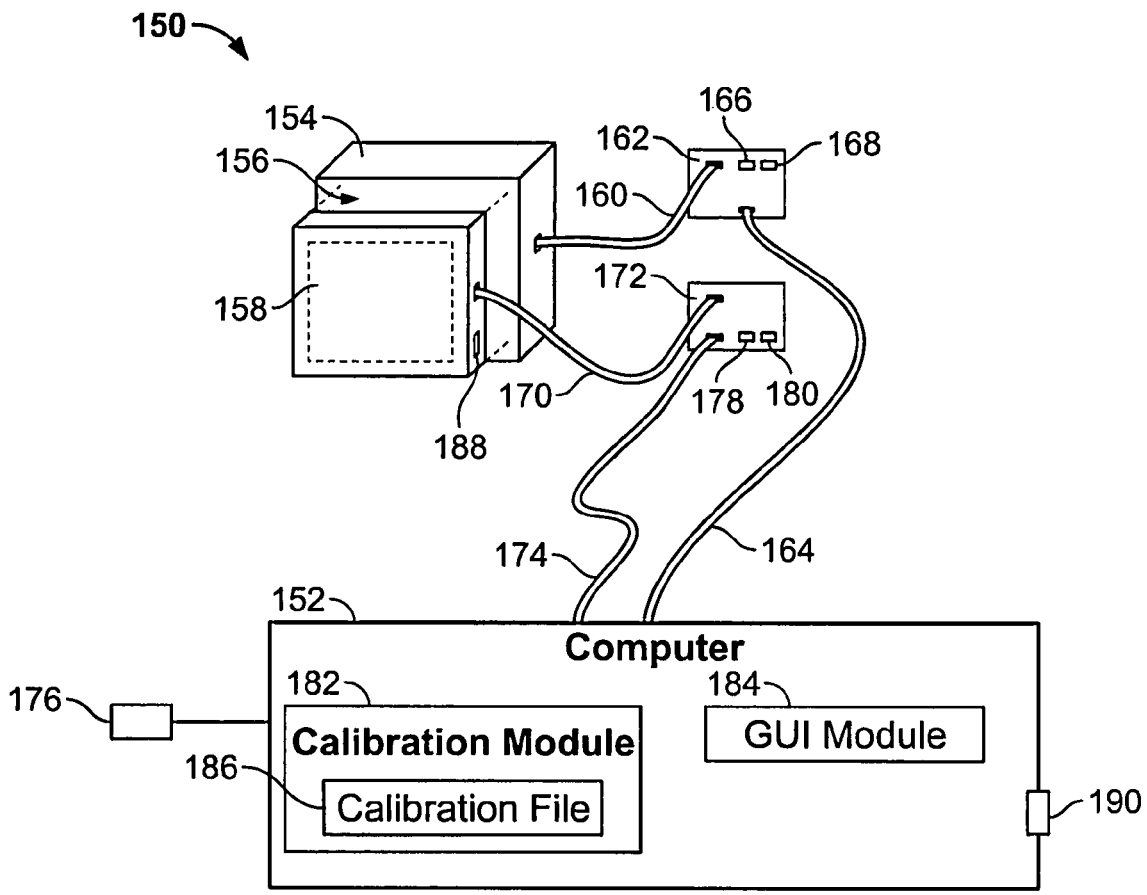
FIG. 2 illustrates a block diagram of a touch display system having a touch display interconnected with a computer in accordance with an embodiment of the present invention.

FIG. 2 illustrates a block diagram of a touch display system 150 having a touch display 154 interconnected with a computer 152. The computer 152 may run one or more applications, such as in a factory for calibration and testing, a retail store, a restaurant, a medical facility and the like. In addition to the touch display 154, the computer 152 may comprise an alternate user input 176 such as a keyboard and/or a mouse. Although indicated separately, the components of the touch display system 150 may be within a single unit, such as a PDA or other portable device.

The touch display 154 comprises components for displaying data on a display screen 156. The display screen 156 may be an LCD, CRT, Plasma, OLED display, photographic image and the like. An APR touchscreen 158 is mounted in front of the display screen 156. The touchscreen 158 comprises a substrate that may be glass or other substantially clear material, and receives input from a user via a finger touch, fingernail, pen, credit card, a stylus, and the like.

A display cable 160 connects the touch display 154 with a display controller 162. The display controller 162 receives video information from the computer 152 over video cable 164. The video information is received and processed by the display controller 162, then transferred to the touch display 154 over the display cable 160 for display on the display screen 156. It should be understood that the touch display 154 and the display controller 162 may be hardwired together or interconnected such that the display cable 160 is not required. The display controller 162 comprises components such as a CPU 166 and a memory 168.

A touchscreen cable 170 interconnects the touchscreen 158 with a touchscreen controller 172. The touchscreen controller 172 sends and receives information to and from the computer 152 over touch data cable 174. Touch events are detected by the touchscreen 158 and transferred over the touchscreen cable 170 to the touchscreen controller 172, which digitizes the signal and sends it over the touch data cable 174 to the computer 152. The touchscreen controller 172 comprises components such as a CPU 178 and memory 180.

A display housing (not shown) may enclose the touch display 154, the display and touchscreen cables 160 and 170, and the display and touchscreen controllers 162 and 172. The display housing may enclose an outer edge portion of the touchscreen 158, securing the touchscreen 158 and/or covering fasteners which secure the touchscreen 158 to the display screen 156. The video and touch data cables 164 and 174 may be separate cables or packaged together. The video and touch data cables 164 and 174 may extend from the display housing to the location of the computer 152. Optionally, the display housing may be a cover for a PDA or other small hand-held or portable device which may or may not hold the computer 152 there-within. Also, the touch data cable 174 and video cable 164 may be replaced by wireless technology.

Each APR touchscreen 158 is calibrated or characterized prior to normal operation as variability of components, as discussed further below, alter the touch signal generated by a touch. Therefore, a calibration module 182 may be provided within the computer 152 for storing a calibration file 186 appropriate to the specific APR touchscreen 158. In one embodiment, the calibration module 182 and/or calibration file 186 may be provided on an integrated circuit or other microchip, such as on the touchscreen cable 170 or touchscreen controller 172. In another embodiment, a touchscreen identifier 188 may be used to identify the touchscreen 158. The calibration file 186 may be downloaded by way of an input/output (I/O) port 190 associated with the computer 152 as discussed further below. For example, the I/O port 190 may be configured to have wireless capability and/or may be configured to physically receive a readable storage medium. The calibration file 186 may comprise a plurality of audio profiles that may be stored in a lookup table format. During run-time, the calibration module 182 identifies an X, Y coordinate location of a user touch by comparing detected signal(s) generated by the user touch to the audio profiles stored in the calibration file 186. The audio profile that best matches the detected signal indicates a matching location, and the associated X, Y coordinates are identified.

The calibration module 182 passes the X, Y coordinates to a GUI module 184 that may be stored within one or more modules of firmware or software. The Microsoft Windows® operating system is one example of a GUI module 184. The GUI module 184 determines whether the coordinates indicate a selection of a GUI button or icon displayed on the display screen 156. If a GUI button is selected, the computer 152 will take further action based on the functionality associated with the particular GUI button.

Figure 3:
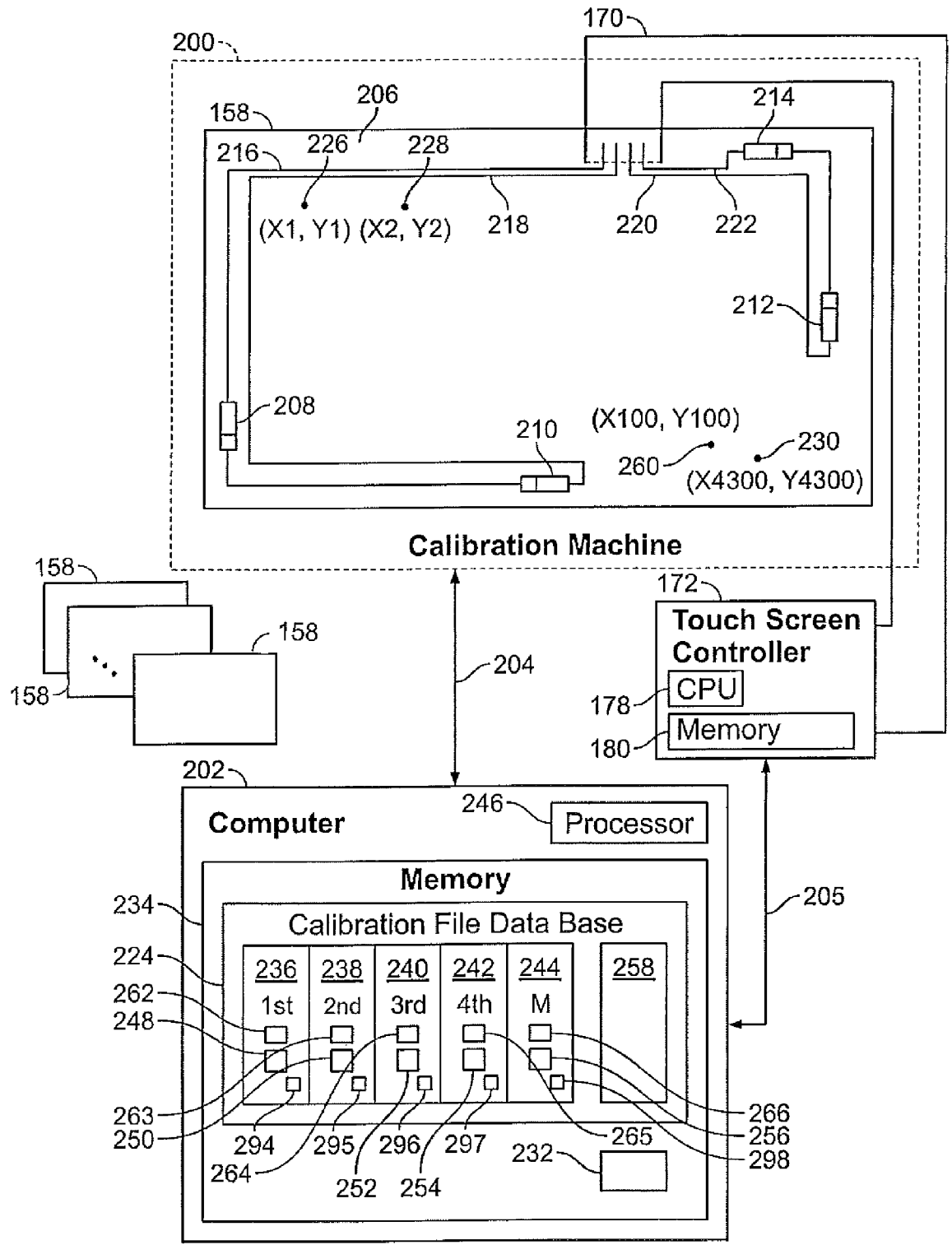
FIG. 3 illustrates the APR touchscreen of FIG. 1 interconnected with a calibration machine in accordance with an embodiment of the present invention.

FIG. 3 illustrates the APR touchscreen 158 of FIG. 1 interconnected with a calibration machine 200. Although illustrated generically, the calibration machine 200 also has the ability to generate touch events on the touchscreen 158 at specific, predetermined X, Y coordinate locations. The number and location of desired touch events may be input previously by a user into computer 202, and communicated to the calibration machine 200 via line 204. For example, 4,300 X, Y coordinate locations may be identified to collect audio profiles from 4,300 different touch points on the touchscreen 158.

The touchscreen 158 has a substrate, such as a sheet of glass 206, upon which piezo microphones 208, 210, 212 and 214 and associated traces 216, 218, 220 and 222 are mounted. The microphones 208, 210, 212 and 214 detect sound and transmit signals along the traces 216, 218, 220 and 222, respectively, which interface with the touchscreen cable 170 to convey the signals to the touchscreen controller 172.

As discussed previously, each touchscreen 158 is slightly different due to differences and variability in components, and thus a unique calibration file is typically generated for each touchscreen 158. For example, the overall or average thickness of the glass 206 may vary. The thickness of the glass 206 may also vary slightly across the area of the glass 206. The variations may be quite small and no practical way for measuring and/or quantifying the variations is available. In addition, the glass 206 may be cut from a larger piece of glass, and thus the size of each piece may vary slightly. Edges of the glass 206 may not be polished and thus do not reflect sound waves in the same way. The position on the glass 206, as well as the sensitivity, of the piezo microphones 208, 210, 212 and 214 may also vary. The microphones 208, 210, 212 and 214 are subjected to heat when bonded to the glass 206, which may result in degradation in performance. Also, the thickness of each of the microphones 208, 210, 212 and 214 may not be exactly the same. Other factors of variability may also contribute to changes from one touchscreen 158 to the next.

Therefore, the audio profiles generated for each of the 4,300 touch points may vary slightly or substantially from one touchscreen 158 to the next. For practical purposes, however, the calibration files of first and second touchscreens 158 may be close to the same, such that the same calibration file may be used by both without degrading the functionality of either. A third and fourth touchscreen 158 may both use a second calibration file that is different than the calibration file of the first and second touchscreens 158.

Figure 4:
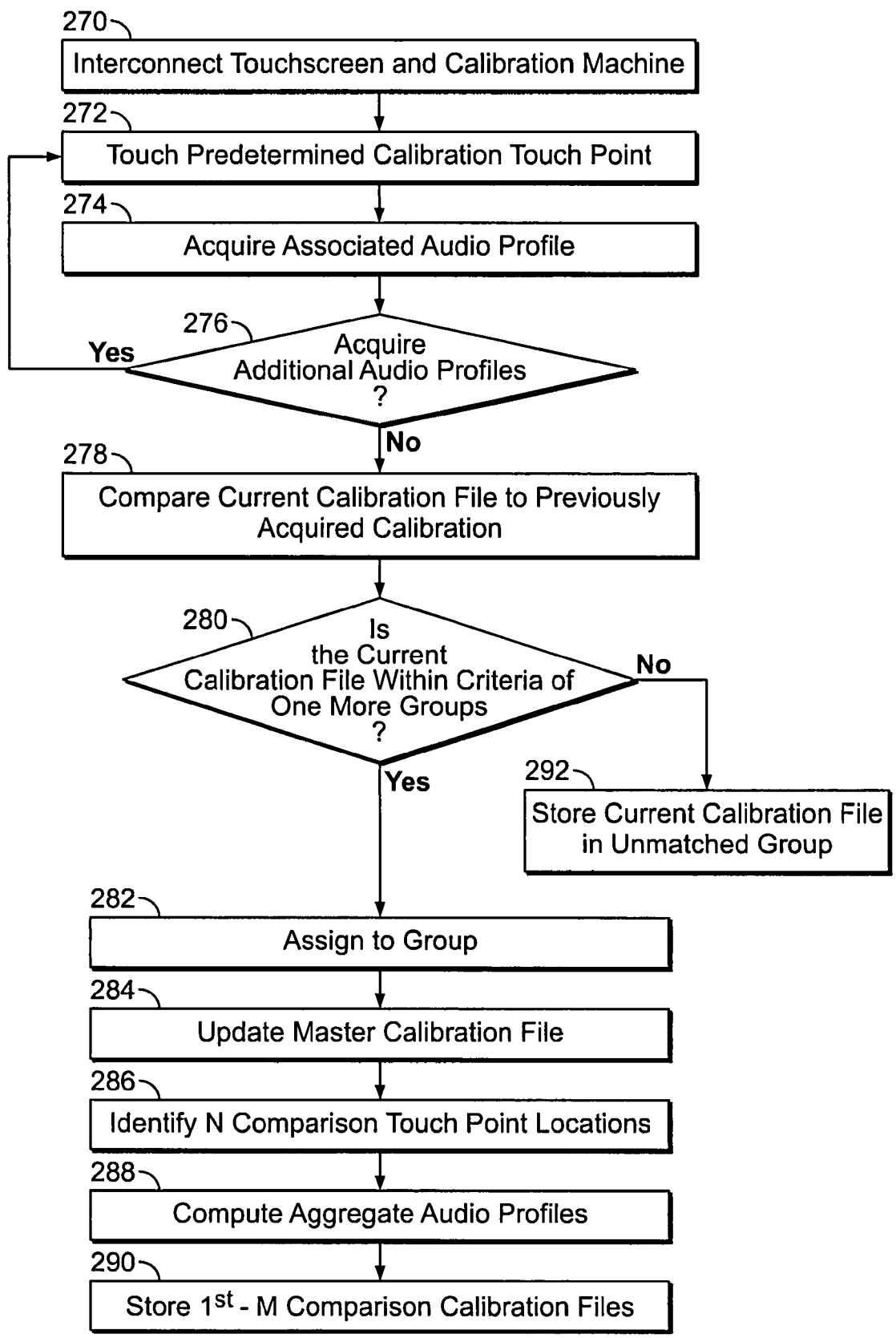
FIG. 4 illustrates a method for generating predetermined calibration files which may be used by a plurality of touchscreens in accordance with an embodiment of the present invention.

FIG. 4 illustrates a method for generating predetermined calibration files, each of which may be used by a plurality of touchscreens 158. Each predetermined calibration file is based on a group of similar calibration files acquired from different touchscreens 158. Therefore, a predetermined calibration file may be used by a touchscreen 158, saving time and expense as a unique calibration file may not need to be acquired. FIGS. 3 and 4 will be discussed together.

At 270, the touchscreen 158 is interconnected with the calibration machine 200. At 272, the calibration machine 200 generates a touch on the touchscreen 158 at a predetermined calibration touch point (such as at first touch point 226 having coordinates X1, Y1). A processor 246 within the computer 202 may identify and transmit the predetermined calibration touch points over the line 204. At 274, the microphones 208, 210, 212 and 214 detect signals resulting from the touch, and send detected signals via the touchscreen cable 170 to the touchscreen controller 172. The touchscreen controller 172 may digitize the signals and convey a digitized audio profile over line 205 to the computer 202. The audio profile may be stored in current calibration file 232 in memory 234, and is associated within the current calibration file 232 with the coordinates of the first touch point 226.

At 276, if additional audio profiles are to be acquired, the method returns to 272. For example, the calibration machine 200 may generate a touch at touch point 228 having coordinates X2, Y2. This process is repeated for all predetermined calibration touch points, such as through a 4,300$^{th}$ touch point 230 having coordinates X4300, Y4300. The predetermined calibration touch points may form a uniform grid, random pattern, or other desired pattern. For example, a larger number of predetermined calibration touch points may be grouped within a particular area of the touchscreen 158 that typically displays small icons or selectable graphics.

When all of the audio profiles have been acquired, the method passes from 276 to 278. The current calibration file 232 has a string of 4,300 audio profiles representing each touch point. As discussed previously, each calibration file will be different from all others, and the amount of difference may vary.

Calibration file database 224 is also stored within the memory 234. The calibration file database 224 includes previously acquired calibration files that have been sorted based on their similarity to one another. For example, an initial number of M groups or buckets of similar calibration files may be established. First group 236, second group 238, third group 240, fourth group 242 and M group 244 are illustrated. In one example, M may initially be set to 50, forming 50 different groups. However, as additional touchscreens are characterized and the calibration files are compared to previous calibration files, additional groups may be formed. Optionally, groups may be combined if differences between calibration files are minimal and do not negatively impact the operation of the touchscreen 158.

At 278, a processor 246 may be used to compare the current calibration file 232 to calibration files within the first through M groups 236-244. By way of example, criteria, such as a difference threshold, may be used to identify acceptable similarity. The current calibration file 232 may be compared to all of the stored calibration files, a subset of the calibration files within each group, such as a predetermined number or a percentage of the calibration files within each of the first through M groups 236-244, a subset of, or all of, the audio profiles within each of the calibration files, and the like.

At 280, the processor 246 determines whether the current calibration file 232 meets the criteria of one or more groups, thus forming a good match. For example, the current calibration file 232 may be within the criteria or a tolerance of acceptability, such as below the difference threshold, of calibration files within the first and second groups 236 and 238. If the current calibration file 232 is a good match with one group, at 282 the processor 246 assigns the current calibration file 232 to the identified group. If more than one group is identified, as in the example above, the processor 246 may assign the current calibration file 232 to the group that is the best match, representing the least amount of difference.

Each of the first through M groups 236-244 may have a master or predetermined calibration file, such as first, second, third, fourth and M predetermined calibration files 248, 250, 252, 254, and 256, that may be stored and used with applicable touchscreens 158. In this example, at 284 the processor 246 may optionally update a predetermined calibration file associated with the group identified at 282, such as for the first group 236. The first predetermined calibration file 248 may be updated by averaging the audio profiles of the current calibration file 232 with all of the calibration files within the first group 236.

At 286, the processor 246 identifies N comparison touch point locations. By way of example, N may be 50 or 100 comparison touch points that are a subset of the total number of predetermined calibration touch points. In this case, N may be a subset of the 4,300 predetermined calibration touch points. In general, corresponding touch points of future touchscreens 158 may be compared to the N comparison touch points to identify an applicable predetermined calibration file. At 288, the processor 246 may compute an aggregate audio profile for each of the N comparison touch points. This may be accomplished by averaging a predetermined number of audio profiles from coordinate positions surrounding the specific X, Y coordinate location of each of the N comparison touch points. Optionally, the processor 246 may use the single audio profile associated with each of the N comparison touch points.

At 290, first through M comparison calibration files 262, 263, 264, 265 and 266, comprising a set of aggregate pre-recorded audio profiles (or a set of pre-recorded audio profiles, each of which represents a single coordinate location) of the first through N comparison touch points, are stored in the memory 234. The first through M comparison calibration files 262-266 may be used in the method of FIG. 5 to determine which of the first through M predetermined calibration files 248-256, if any, is applicable for a touchscreen 158 being characterized. It should be understood that the first through M comparison calibration files 262-266, as well as the first through M predetermined calibration files 248-256, may be stored separately and/or together with the audio profiles upon which they are based within the calibration file database 224. Also, as additional calibration files are acquired (270-282), the processor 246 may update the applicable first through M predetermined calibration files 248-256 and/or the first through M comparison calibration files 262 through 266.

Returning to 280, if no group match is identified, at 292 the processor 246 may store the current calibration file 232 within an unmatched group 258 of calibration files that have parameters outside of all of the currently established groups. Calibration files within the unmatched group 258 may be evaluated periodically, such as when a minimum number of calibration files has been stored, to identify whether an additional group may be created.

Figure 5:
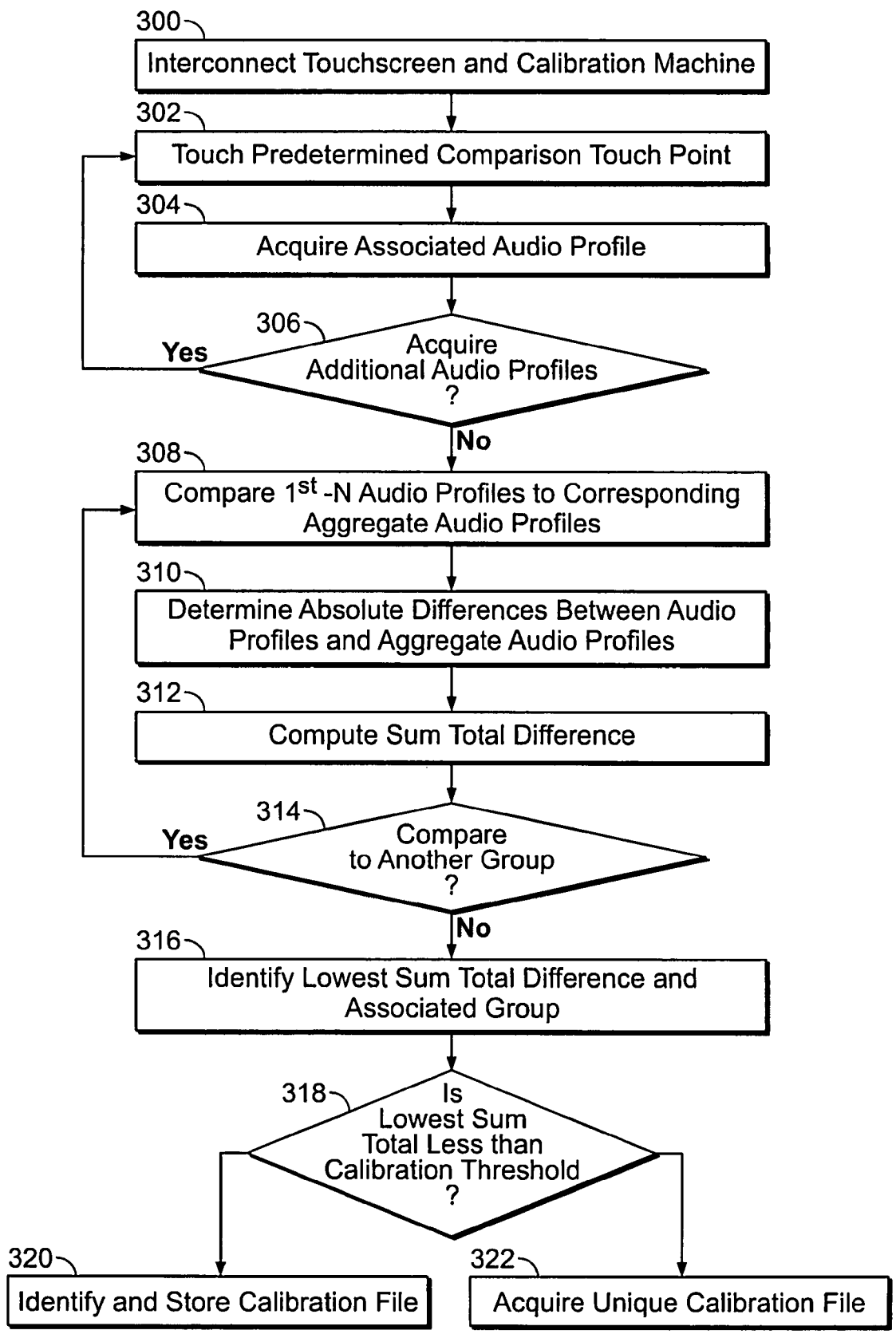
FIG. 5 illustrates a method for selecting a predetermined calibration file for an APR touchscreen being characterized from within the set of predetermined calibration files in accordance with an embodiment of the present invention.

FIG. 5 illustrates a method for selecting a predetermined calibration file for an APR touchscreen 158 being characterized from within a set of predetermined calibration files, such as the first through M predetermined calibration files 248-256. At 300, the touchscreen 158 (FIG. 3) is interconnected with the calibration machine 200. At 302, the calibration machine 200 initiates a touch on the touchscreen 158 at a comparison touch point, such as at the first touch point 226 having coordinates X1, Y1. The calibration touch point may correspond to one of the N comparison touch points identified at 286 of FIG. 4. The comparison touch point (coordinate location X1, Y1 of the first touch point 226) may represent a center touch point of an area of touch points used to compute an aggregate audio profile at 288 of FIG. 4.

At 304, the microphones 208, 210, 212 and 214 detect signals and send the detected signals via the touchscreen cable 170 to the touchscreen controller 172. The touchscreen controller 172 digitizes the signals and conveys the digitized audio profile over line 205 (FIG. 3) to the computer 202. The audio profile may be stored in the current calibration file 232, and is associated with the coordinates of the first touch point 226.

At 306, if additional audio profiles are to be acquired, the method returns to 302. In contrast with the method of FIG. 4, less audio profiles are acquired, such as, for example, the 50 or 100 audio profiles rather than the approximately 4300 audio profiles. Therefore, audio profiles may be acquired up to, for example, N comparison touch point 260 having coordinates X100, Y100.

When N audio profiles have been acquired, the method passes from 306 to 308. In this example, the current calibration file 232 may have a string of 100 audio profiles representing the first through N comparison touch points.

In general, the processor 246 compares each of the audio profiles within the current calibration file 232 to audio profiles from corresponding coordinate positions that are stored within the first through M comparison calibration files 262-266 to find the best or closest match. Therefore, the audio profiles within the current calibration file 232 may be compared to an aggregate of the audio profiles representative of a small area surrounding the coordinate location from which the particular audio profile was generated. The best match may then be compared to a criteria, such as a difference threshold, to ensure that the best match is within desirable parameters.

For simplicity, the method is discussed as a single comparison between the current calibration file 232 and the first comparison calibration file 262. At 308, the processor 246 compares each of the first through N audio profiles within the current calibration file 232 to the first through N aggregate pre-recorded audio profiles having corresponding coordinate positions within the first comparison calibration file 262. At 310, the processor 246 determines an absolute difference between each of the first through N audio profiles and the corresponding first through N aggregate pre-recorded audio profile.

At 312, the processor 246 computes a sum total difference, such as by adding all of the absolute differences determined at 310. The sum total difference may be stored for reference in the memory 234. At 314, if the current calibration file 232 is to be compared to additional comparison calibration files, the method returns to 308. If the current calibration file 232 has been compared to the first through M comparison calibration files 262-266, the method passes to 316.

At 316, the processor 246 identifies the lowest sum total difference and the associated group. At 318, the processor 246 compares the lowest sum total to a predetermined level or calibration threshold. For example, a difference norm or difference threshold may be established and used when comparing audio profiles. If an absolute difference between two audio profiles is below the difference threshold, the two audio profiles may be considered to be the same for practical purposes.

If the lowest sum total difference is less than the calibration threshold, at 320 the processor 246 identifies the predetermined calibration file associated with the group identified at 316. The identified predetermined calibration file may be stored in the memory 180 of the touchscreen controller 172 or as the calibration file 186 within the calibration module 182 of FIG. 2.

Returning to 318, if the lowest sum total is greater than the calibration threshold, a unique calibration file is acquired at 322. This may be accomplished using the method of FIG. 4, wherein many audio profiles, such as the 4,300 audio profiles, are acquired and saved as the calibration file 186 within the calibration module 182. The current calibration file 232 may then also be stored in the unmatched group 258 (as at 292 of FIG. 4).

Therefore, rather than acquiring a great number of audio profiles to create unique calibration files for each APR touchscreen, the APR touchscreens may be more quickly characterized by acquiring only a small number of audio profiles. More touchscreens can be characterized in less time, and the time required for interconnecting the APR touchscreens and the calibration machine is reduced.

In one embodiment, it may be desirable or necessary to reload and/or restore the calibration file of a touchscreen 158 at a point in time after the touchscreen 158 has been characterized. Therefore, each touchscreen 158 may be provided with a unique serial number or other identifier that may be used to identify the predetermined calibration file associated with the touchscreen 158. Returning to FIG. 3, first through M identifiers 294, 295, 296, 297 and 298 (e.g. identifiers may be lists of serial numbers, an integer or set of integers, or other unique identifiers) may be stored in and/or associated with the calibration file database 224.

The identifier may be used by a customer or service personnel to subsequently download the associated master calibration file (from the first through M predetermined calibration files 248-256) over the internet or from storage medium such as a disk or flash memory. By way of example, it may be desirable to download or otherwise access the first through M predetermined calibration files 248-256 if the calibration file 186 becomes corrupt or is missing, such as if the hardware, firmware and/or software are damaged, replaced, and/or upgraded, or if the touchscreen 158 is initially shipped to a customer without the calibration file 186 loaded.

More specifically, the touchscreen 158 of FIG. 2 may be designed, manufactured and shipped without a memory chip or any other circuitry for storing the applicable calibration file. Instead, sufficient information may be provided via a serial number, other code on a label (optionally in bar code format), and/or additional product literature to determine the calibration file to be loaded on the host computer 152 via the internet, disk, flash memory or other medium.

For example, the touchscreen identifier 188 may be a bar code, label or sticker provided on or with the touchscreen 158, the computer 152, and/or the touch data cable 174. The touchscreen identifier 188 may be a unique serial number, series of characters or bar code associated with the touchscreen 158. The touchscreen identifier 188 may be associated with a particular predetermined calibration file 186. Alternatively, the touchscreen identifier 188 may be associated with one of the groups, such as with the first group 236 or second group 238 as illustrated in FIG. 3.

During installation, calibration or re-calibration procedures, the operator may be prompted to initialize the touchscreen 158. For example, the touchscreen 158 may need to be initialized or calibrated prior to the first use. During installation, the operator may be prompted to enter or scan in (such as with a bar code reader) the touchscreen identifier 188, and the computer 152 may access, via the I/O port 190, a computer readable medium such as a compact disc, flash memory or other medium, or may access a network or the interne to retrieve the calibration file 186 associated with the touchscreen identifier 188.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112, sixth paragraph, unless and until such claim limitations expressly use the phrase "means for" followed by a statement of function void of further structure.

What is claimed is:

1. A method for calibrating an Acoustic Pulse Recognition (APR) touch substrate having a plurality of microphones mounted thereon, comprising:
   touching the APR touch substrate at N comparison touch points;
   acquiring N audio profiles, each of the N audio profiles being associated with one of the N comparison touch points; and
   selecting a predetermined calibration file from within a plurality of predetermined calibration files, said selecting being based on the N audio profiles, the predetermined calibration file comprising audio profiles associated with coordinate locations on the touch substrate, wherein each of said plurality of predetermined calibration files is acquired from APR touch substrates other than said APR touch substrate.

2. The method of claim 1, the selecting further comprising comparing the N audio profiles to at least first and second sets of audio profiles, the first and second sets being associated with first and second predetermined calibration files, respectively.

3. The method of claim 1, further comprising:
   determining a difference between the N audio profiles and a first set of prerecorded audio profiles; and
   comparing the difference to a difference threshold, the selecting being based on a relationship between the difference and the difference threshold.

4. The method of claim 1, further comprising:
   comparing the N audio profiles to at least first and second sets of N pre-recorded audio profiles to determine at least first and second differences;
   identifying a lowest difference from within the at least first and second differences; and
   selecting the predetermined calibration file based on the lowest difference.

5. The method of claim 1, wherein N is less than a total number of audio profiles within the predetermined calibration file.

6. The method of claim 1, further comprising comparing the N audio profiles to a set of pre-recorded audio profiles, each of the pre-recorded audio profiles being based on at least one audio profile representative of at least one comparison touch point on the APR touch substrate.

7. A system for calibrating an Acoustic Pulse Recognition (APR) touch substrate, comprising:
   the APR touch substrate;
   a plurality of microphones mounted to the APR touch substrate; and
   a processor configured to:
      receive N audio profiles associated with N comparison touch points, the N audio profiles representative of signals detected by the plurality of microphones;
      compare the N audio profiles to a plurality of sets of N pre-recorded audio profiles, each set of N pre-recorded audio profiles associated with a respective predetermined calibration file of a plurality of predetermined calibration files; and
      select a predetermined calibration file from the plurality of predetermined calibration files based on the comparison of the N audio profiles to the plurality of sets of N pre-recorded audio profiles, the predetermined calibration file comprising audio profiles being representative of coordinates of touch points on the APR touch substrate, wherein each of said plurality of predetermined calibration files is acquired from APR touch substrates other than said APR touch substrate.

8. The system of claim 7, wherein N is less than a total number of the audio profiles within the predetermined calibration file.

9. The system of claim 7, the processor further configured to define N representative touch points having coordinates on the APR touch substrate, each of the N representative touch points corresponding to one of the N pre-recorded audio profiles within each of the sets.

10. The system of claim 7, wherein the N pre-recorded profiles are aggregate audio profiles representative of more than one touch point.

11. The system of claim 7, the processor further configured to compare the N audio profiles to at least first and second sets of pre-recorded audio profiles, the first and second sets being associated with first and second predetermined calibration files, respectively.

12. The system of claim 7, the processor further configured to:
   determine a difference between the N audio profiles and a first set of pre-recorded audio profiles;
   compare the difference to a difference threshold; and
   select the predetermined calibration file based on a relationship between the difference and the difference threshold.

13. An Acoustic Pulse Recognition (APR) touch sensor, comprising:
   an APR touch substrate; and
   a memory configured to store a predetermined calibration file including a plurality of audio profiles acquired from APR touch substrates other than said APR touch substrate.

* * * * *